US012396559B2

(12) United States Patent
Gibson et al.

(10) Patent No.: US 12,396,559 B2
(45) Date of Patent: Aug. 26, 2025

(54) ASSEMBLAGE FOR FORMING A TREATMENT CHAIR

(71) Applicant: Aaron Gibson, Enfield (GB)

(72) Inventors: Aaron Gibson, Enfield (GB); Robert Footitt, Newcastle-upon-Tyne (GB)

(73) Assignee: Aaron Gibson, Enfield (GB)

(*) Notice: Subject to any disclaimer, the term of this patent is extended or adjusted under 35 U.S.C. 154(b) by 0 days.

(21) Appl. No.: 17/998,653

(22) PCT Filed: May 11, 2021

(86) PCT No.: PCT/GB2021/051130
§ 371 (c)(1),
(2) Date: Nov. 11, 2022

(87) PCT Pub. No.: WO2021/229215
PCT Pub. Date: Nov. 18, 2021

(65) Prior Publication Data
US 2023/0346123 A1 Nov. 2, 2023

(30) Foreign Application Priority Data
May 13, 2020 (GB) ...................................... 2007082

(51) Int. Cl.
*A47C 1/06* (2006.01)
*A47C 4/02* (2006.01)
(Continued)

(52) U.S. Cl.
CPC .................. *A47C 1/06* (2013.01); *A47C 4/02* (2013.01); *A47C 1/023* (2013.01); *A47C 1/0345* (2013.01);
(Continued)

(58) Field of Classification Search
CPC ......... A47C 1/023; A47C 1/024; A47C 1/034; A47C 1/0345; A47C 1/037; A47C 1/04;
(Continued)

(56) References Cited

U.S. PATENT DOCUMENTS 5,505,524 A * 4/1996 Drumwright .......... A47C 7/004 297/183.5
10,426,269 B1 * 10/2019 O'Hara .................. A47C 3/026
(Continued)

FOREIGN PATENT DOCUMENTS

CN 107028395 A 8/2017
DE 33 35 463 A1 4/1985
(Continued)

OTHER PUBLICATIONS

International Search Report and Written Opinion issued in PCT/GB2021/051130, mailed Oct. 29, 2021.

*Primary Examiner* — Syed A Islam
(74) *Attorney, Agent, or Firm* — MARSHALL, GERSTEIN & BORUN LLP

(57) ABSTRACT

An assemblage (10) is disclosed for assembling into a treatment chair for seating a subject undergoing a personal treatment, and subsequently disassembling for reassembly. The assemblage comprises a seat and backrest assembly (20), and a stand (assembly 50) for rotatably supporting the seat and backrest assembly. The seat and backrest assembly comprises a seat (21) and a (backrest 22), the seat comprising an upper side (23) on which the subject sits in use, and an underside (24) comprising a stand assembly mounting means (25) for releasably mounting the stand assembly. The backrest engages with the seat so as to be independently reclinable with respect to the seat, and is detachable from the seat and/or foldable onto the upper side of the seat so as to lie substantially flat therewith. The stand assembly comprises seat engagement means (51) for releasably engaging
(Continued)

with the underside of the seat, hydraulic height adjustment (means 53) for hydraulically raising and lowering the height of the seat and backrest assembly in use, and legs (56) which are foldable between an extended position in which the legs extend laterally from the stand assembly to support the treatment chair in use, and a folded position in which they lie against or adjacent the hydraulic height adjustment means.

20 Claims, 10 Drawing Sheets

(51) Int. Cl.

| | |
|---|---|
| *A47C 1/023* | (2006.01) |
| *A47C 1/034* | (2006.01) |
| *A47C 4/04* | (2006.01) |
| *A47C 7/00* | (2006.01) |
| *A61G 5/12* | (2006.01) |
| *A61G 5/14* | (2006.01) |

(52) U.S. Cl.
CPC ................ *A47C 4/04* (2013.01); *A47C 7/004* (2013.01); *A61G 5/128* (2016.11); *A61G 5/14* (2013.01)

(58) Field of Classification Search
CPC .. A47C 1/06; A47C 4/02; A47C 7/004; A47C 7/50; A61G 5/128; A61G 5/12; A61G 5/14
See application file for complete search history.

(56) References Cited

U.S. PATENT DOCUMENTS

| | | | | |
|---|---|---|---|---|
| 10,842,280 | B2 * | 11/2020 | Powicki | A47C 7/462 |
| 11,235,686 | B2 * | 2/2022 | Daul | B60N 2/2236 |
| 2011/0068613 | A1 | 3/2011 | Breitkreuz et al. | |
| 2020/0069066 | A1 * | 3/2020 | Tse | H02J 50/10 |
| 2021/0145178 | A1 * | 5/2021 | Riley | A47C 1/03222 |

FOREIGN PATENT DOCUMENTS

| | | | |
|---|---|---|---|
| DE | 37 24 615 | A1 | 2/1989 |
| WO | WO-2018/030894 | A1 | 2/2018 |

* cited by examiner

ASSEMBLAGE FOR FORMING A TREATMENT CHAIR

The present invention relates to an assemblage for forming a treatment chair for seating a subject undergoing a treatment, such as but not limited to a grooming treatment, for example hairdressing.

A person performing a treatment, such as a hairdresser, will wish to position the individual undergoing the treatment as they require when performing the treatment. For this purpose, the subject is usually seated on a specialized treatment chair, which is adjustable in different ways. Thus, the height of the chair seat is adjustable, for example by a manual, pedal-operated, or motorized adjusting mechanism (for example a hydraulic pump), to raise or lower the height of the subject, and the seat swivels to rotate the subject. The backrest of the chair reclines, and/or it may have an adjustable footrest, headrest and/or armrests. A barber's chair is a well-known example of such a chair.

Treatment providers will thus typically furnish their business premises with specialized adjustable treatment chairs designed to meet their requirements. However, a treatment provider who provides their services away from their premises, such as in a home or office, may not have the use of a specialized chair: there is unlikely to be such a chair at the treatment location, and a chair cannot be brought from their professional premises since they are usually permanent fixtures, and are also both large and heavy (e.g. a typical barber's chair may have a mass of 60-70 kg). In these circumstances, the provider will need to make do with what is available at the treatment location, such as a kitchen stool, office chair, or dining chair. However, this can present problems for the treatment provider, not only in terms of the inconvenience of not being able to correctly position the subject, but also for their physical wellness. For example, a treatment provider may treat a number of different subjects over a number of hours in different locations, and if the provider needs to stretch or stoop to perform the treatment due to the subject being incorrectly positioned then they may consequently suffer physical strains.

There is thus a need for a functional treatment chair which can be easily transported from one treatment location to another and quickly reassembled in situ.

Thus, according to the present invention there is provided an assemblage for assembling into a treatment chair for seating a subject undergoing a personal treatment and subsequently disassembling for reassembly, the assemblage comprising a seat and backrest assembly, and a stand assembly for rotatably supporting the seat and backrest assembly;

- wherein the seat and backrest assembly comprises a seat and a backrest;
- the seat comprising an upper side on which the subject sits in use, and an underside comprising a stand assembly mounting means for releasably mounting the stand assembly;
- the backrest engaging with the seat so as to be independently reclinable with respect to the seat, and being detachable from the seat and/or foldable onto the upper side of the seat so as to lie substantially flat therewith;
- wherein the stand assembly comprises seat engagement means for releasably engaging with the underside of the seat; hydraulic height adjustment means for hydraulically raising and lowering the height of the seat and backrest assembly in use, and legs which are foldable between an extended position in which the legs extend laterally from the stand assembly to support the treatment chair in use, and a folded position in which they lie against or adjacent the hydraulic height adjustment means.

Herein the term "treatment" means any medical or non-medical treatment of a subject for which the subject must be or is preferably seated. The portable treatment chair of the present invention is preferably for use in personal grooming treatments, such as hairdressing/barbering, but might also be used for cosmetic treatments, such as make-up treatments and tattooing, and for medical treatments, such as dentistry.

The present invention thus provides an assemblage for assembling into a treatment chair for seating a subject undergoing a personal treatment, such as a haircut. The assemblage can be compactly packed, preferably in a case or bag, for example a wheeled case, transported to a treatment location in a passenger car, preferably in the boot of a saloon car or hatchback (for example a Compact car or larger according to ACRISS car classification code) without needing to fold down the rear seats, and quickly and easily assembled into the treatment chair in situ. Preferably, the assemblage weighs 25 kg or less so as to be portable by an individual. Preferably the assemblage can be assembled and disassembled tool-free, for example through quick-release locks and thumbscrews. However, when assembled the treatment chair has the functionality of a conventional treatment chair as found for example in a hairdressing salon or barbers, i.e. the seat and backrest assembly swivels, is height adjustable, and the backrest is reclinable relative to the seat, all with an adult human subject occupying the treatment chair, preferably a subject weighing up to 120 kg (this being a typical maximum loading for treatment chairs). In contrast, in an office location for example, a typical office swivel chair is only height adjustable when it is not occupied, which makes it unsuitable for use as a treatment chair.

The assemblage of the present invention thus comprises a seat and backrest assembly which comprises a seat and a backrest. In the seat and backrest assembly, the backrest engages with the seat so as to be independently reclinable with respect to the seat. Thus, the backrest may be hinged to the seat, and may be reclinable through a reclinement adjustment means, such as a gas spring. The reclinement adjustment means may allow the backrest to be releasably locked at different angles of inclination relative to the seat.

The backrest is detachable from the seat and/or foldable onto the upper side of the seat so as to lie substantially flat therewith, for disassembly, packing, and transport of the assemblage. It may be undesirable for the backrest to be detachable and/or foldable in this way when the treatment chair is assembled for use, and the seat and backrest assembly may thus comprise a locking means, and/or a releasable stop for preventing the backrest from being foldable onto the upper side of the seat when the treatment chair is assembled for use, so as to maintain the backrest in a reclinably upright position relative to the seat. When the treatment chair is to be disassembled, the locking means and/or stop is released, allowing the backrest to be detached or folded onto the upper surface of the seat. The locking means and/or stop may comprise a release clip, located for example on the underside of the seat.

The seat and backrest may each comprise a frame onto which a padded base board is respectively attached.

The assemblage of the present invention also comprises a stand assembly for rotatably supporting the seat and backrest assembly.

The stand assembly comprises seat engagement means for releasably engaging with the stand assembly mounting means on the underside of the seat. The seat engagement means may comprise an engagement member which slides and releasably locks into a corresponding receiver on the underside of the seat. The engagement member and receiver are preferably configured to intimately cooperate to substantially prevent relative movement therebetween when engaged. For example, the engagement member may comprise one or more guide slots or recesses which are configured to receive one or more correspondingly shaped projections of the receiver, or vice versa. The engagement member may releasably lock into the receiver by any suitable means, for example by a locking pin.

The stand assembly comprises hydraulic height adjustment means for hydraulically raising and lowering the height of the seat and backrest assembly in use. Such hydraulic height adjustment means are known in the art, and typically comprise an outer member, an inner member telescopically slidable and rotatable within the outer member, a reservoir for hydraulic fluid in fluid communication with the outer member and a pump for pumping hydraulic fluid into and out of the outer member so as to telescopically move the inner member relative to the outer member. The pump may be manually or, more typically, pedal-operated by the user. Alternatively, the pump may be motorized. In preferred embodiments the seat engagement means will be located at the free end of the inner member. The hydraulic height adjustment means preferably comprises releasable locking means for releasably locking the amount of telescopic extension of the inner member from the outer member, for example by preventing ingress or egress of hydraulic fluid, whilst leaving it free to rotate within the outer member.

The stand assembly also comprises legs for supporting the chair in use. The legs are foldable between an extended position in which they extend laterally from the stand assembly to support the treatment chair in use, and a folded position in which they lie against or adjacent the hydraulic height adjustment means. Thus, in preferred embodiments the legs may be pivotally attached to the lower (closed) end of the outer member of the hydraulic height adjustment means at their proximal ends, and may be lockable in the extended and folded positions, for example by locking pins. In the folded position, the legs preferably lie substantially parallel with the outer member. The legs preferably comprise feet at their distal ends to support the treatment chair in use. The feet in turn may be foldable between, and lockable in, extended and folded positions, relative to the legs. Alternatively, the feet may be non-foldable relative to the legs. Thus, for example, the feet may screw into the distal ends of the legs, which can allow for depth adjustment of the feet for levelling the height of the chair. The number of legs is not critical but must be sufficient to provide the treatment chair with sufficient stability in use. Thus, the assemblage may comprise 3, 4, 5, 6, 7 or more legs.

The assemblage of the present invention preferably comprises armrest mounting means for releasably mounting arm rests, and/or a footrest mounting means for releasably mounting a footrest, and/or a headrest mounting means for releasably mounting a headrest. The armrest mounting means and/or the footrest mounting means may be located on the underside of the seat, and/or the headrest mounting means may be located on the rear of the backrest.

The assemblage of the present invention preferably further comprises armrests, in use preferably releasably mounted to armrest mounting means. Each of the armrests may comprise an elongate member which may curve through substantially a right-angle, a proximal end of which may slide into, or otherwise engage with, the armrest mounting means, and be held in position by for example a locking pin or thumbscrew. At a distal end of each elongate member there is preferably attached an armrest pad, which may be foldable between an extended position, for supporting the arms of a subject occupying the chair in use, and a folded position, in which the armrest pad lies substantially parallel with or adjacent the elongate member. The armrest pad may thus be attached to the distal end of the elongate member by a hinge, and is preferably lockable in position by, for example, a locking or index pin. The assemblage preferably comprises two arm rests, positioned in use laterally on either side of the seat.

The assemblage of the present invention may further comprise a footrest, in use preferably releasably mounted to footrest mounting means. The footrest may comprise an elongate member which may curve through substantially a right-angle, a proximal end of which may slide into, or otherwise engage with, the footrest mounting means, and be held in position by for example a locking pin or thumbscrew. At a distal end of the elongate member there is preferably attached a foot support, which may be fixed in position relative to the elongate member, or foldable between an extended position, for supporting the feet of a subject occupying the chair in use, and a folded position, in which the footrest pad lies substantially parallel with or adjacent the elongate member. The foot support may thus be attached to the distal end of the elongate member by a hinge, may be lockable in position by, for example, a locking or index pin, and/or may comprises a stop to limit the relative maximum angle between the foot support and the elongate member in the extended position, for example to prevent the foot support from unfolding beyond substantially a right-angle.

The assemblage of the present invention may further comprise a headrest, in use preferably releasably mounted to headrest mounting means. The headrest may comprise an elongate member which may slide into, or otherwise engage with, the headrest mounting means, and be held in position by for example a locking pin or thumbscrew. At a distal end of the elongate member there is preferably attached a headrest pad for supporting the head of a subject occupying the chair in use. The distance between the headrest pad and the backrest may preferably be adjusted by sliding the elongate member into and out of the mounting means and locking in position as appropriate.

The assemblage of the present invention is portable by an individual, and the materials from which it is made should preferably be selected to as to reduce weight where possible. Suitable materials may include mild steel tubing (e.g. for frames), stainless steel (e.g. for locking components), aluminum (e.g. for frame and lock mountings), chrome-plated metal, polypropylene and/or plywood (e.g. for seat or backrest base boards), nylon (e.g. for locking components), seat foam and nylon cover material (e.g. for padded components).

The assemblage of the present invention preferably further comprises carrying and/or storage means, for containing the disassembled assemblage for transportation from one location to another, and/or storage when not in use. For example, the carrying and/or storage means may comprise one or more foam-containing cases, wherein the foam comprises recesses into which the different component parts of the assemblage may be placed. The recesses may be tailored to the specific shapes of the component parts by, for example, CNC routing.

Assembly of the assemblage into the treatment chair may be performed as is convenient for the user, and need not be performed in any particular order. However, a possible sequence of actions is as follows. For assembly: the legs are unfolded from the folded position to the extended position and preferably locked in position, and where appropriate the feet are similarly attached to the legs or unfolded from the legs, so that the legs can be positioned securely on the floor. If appropriate, the position of the feet relative to the legs may be adjusted, for example by screwing the feet in/out of the legs, to level the height of the chair. The stand assembly seat engagement means is engaged with the stand assembly mounting means on the underside of the seat. For example, in preferred embodiments the seat assembly engagement member may slide and lock into the corresponding receiver on the underside of the seat. The backrest can be attached to the seat or unfolded from its folded position, substantially flat on the upper side of the seat, to the upright position, in preferred embodiments engaging with a stop to prevent it refolding to the folded position. In preferred embodiments, armrests, a headrest and/or a footrest may be attached by, for example sliding or otherwise engaging the proximal end of each elongate member with the relevant mounting means and locking in position, for example using a locking pin or thumbscrew. The armrests and, if foldable, footrest can then be unfolded for use.

In use, once assembled a subject can occupy the treatment chair, and the user can make whatever adjustments to the position of the subject as are desired, for example raising the height of the seat and backrest assembly, raising or lowering the headrest, and reclining the backrest, whilst the subject occupies the treatment chair. The seat and backrest assembly swivels on the stand assembly.

For disassembly, the same sequence of events may be performed in reverse, e.g. folding and removal of the armrests, headrest and/or footrest from the seat and backrest assembly as appropriate, if necessary lowering the seat and backrest assembly to the minimum height using the hydraulic height adjustment means, detaching the backrest from the seat, or folding the backrest on to the upper side of the seat so as to lie substantially flat therewith, disengaging the stand assembly from the stand assembly mounting means, and detaching or folding the feet and legs into the folded position as appropriate. The disassembled assemblage may then be packed into a carry case or bag, stowed in the boot of a car, and transported to a different location for reassembly.

An embodiment of the assemblage of the present invention will now be described in detail with reference to the accompanying drawings, in which FIGS. 1A and 1B are front and rear perspective views respectively of an embodiment of an assemblage of the present invention assembled into a treatment chair;

Figure 1A:
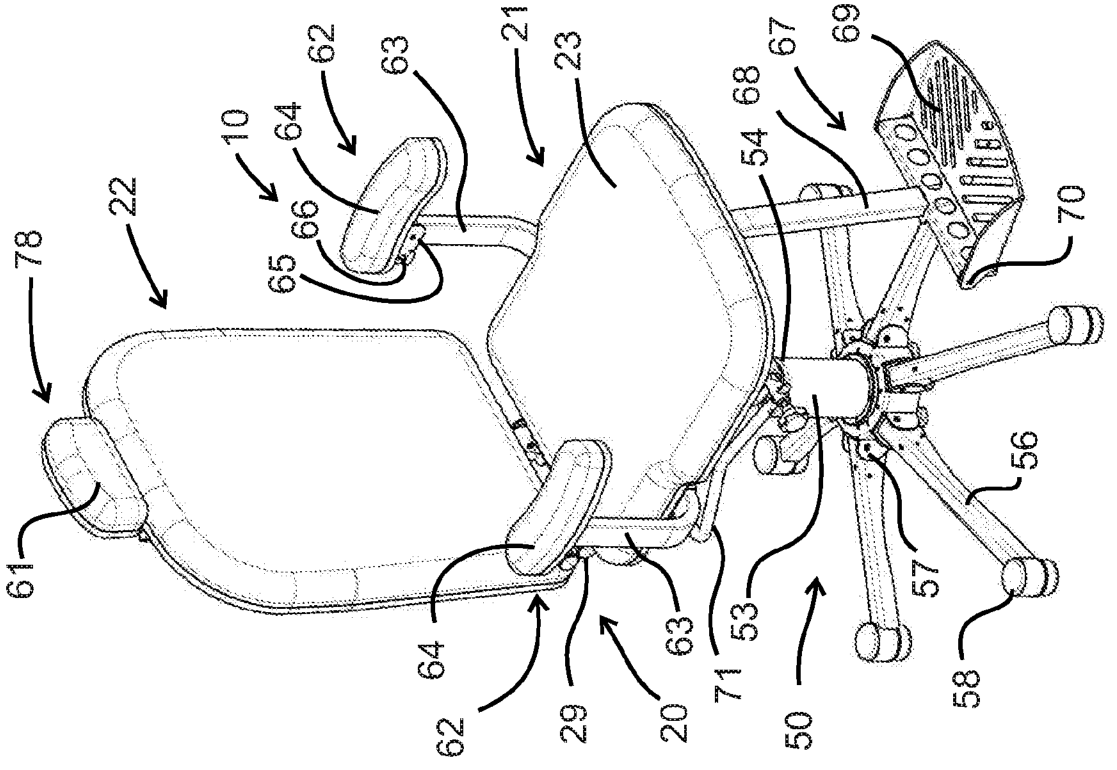
Figure 1B:
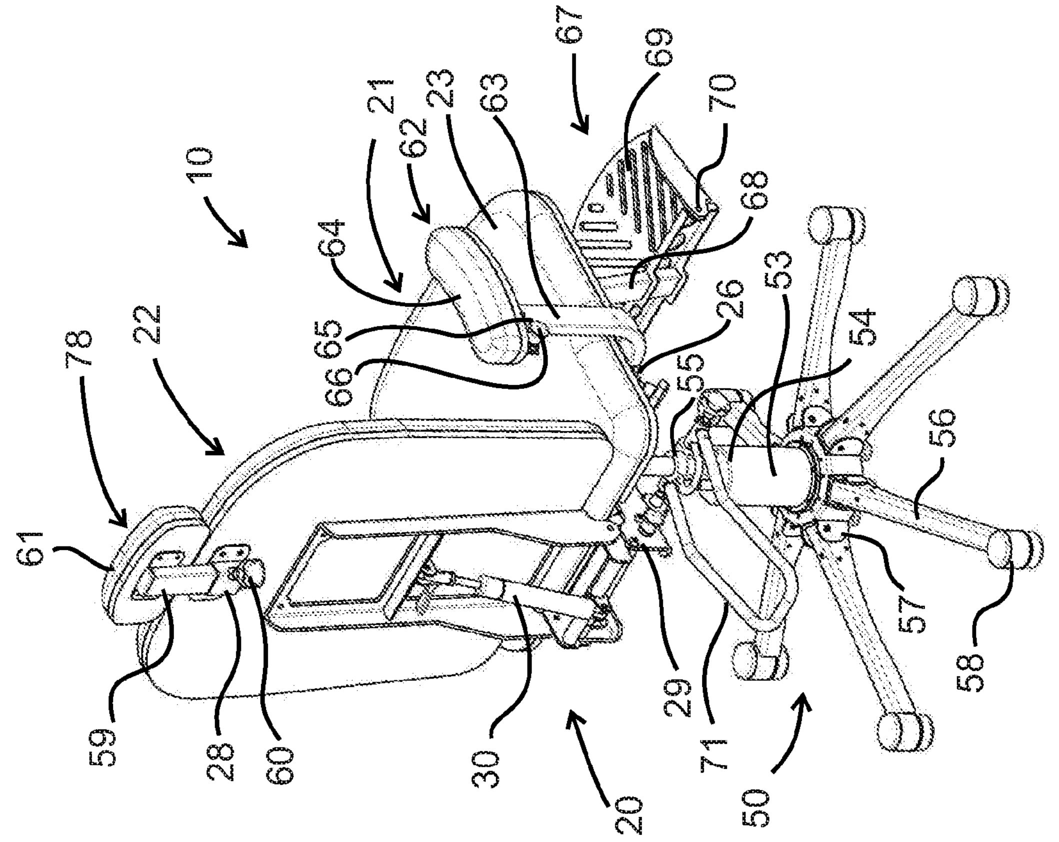
Figure 2B:
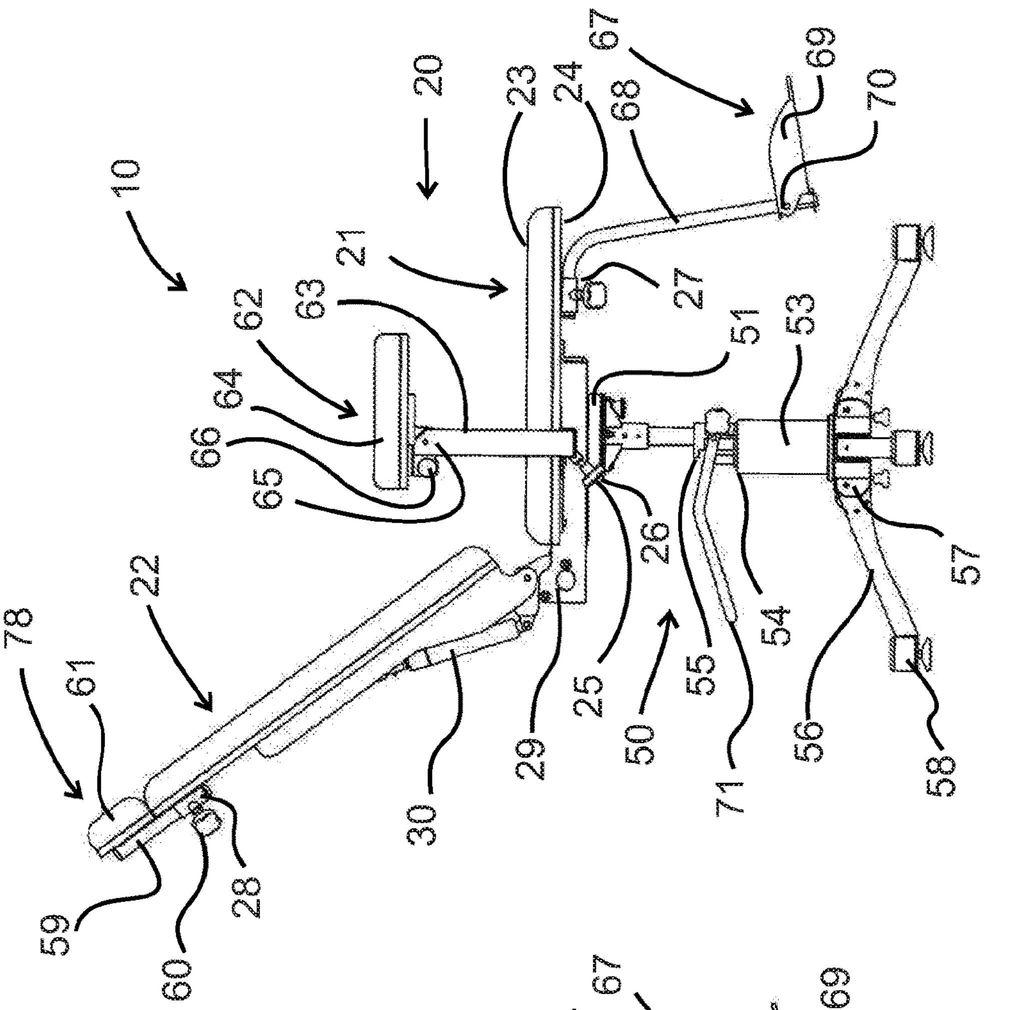
FIGS. 2A and 2B are side views of the assemblage of FIGS. 1A and 1B showing the minimum and maximum backrest recline angles respectively.
Figure 2A:
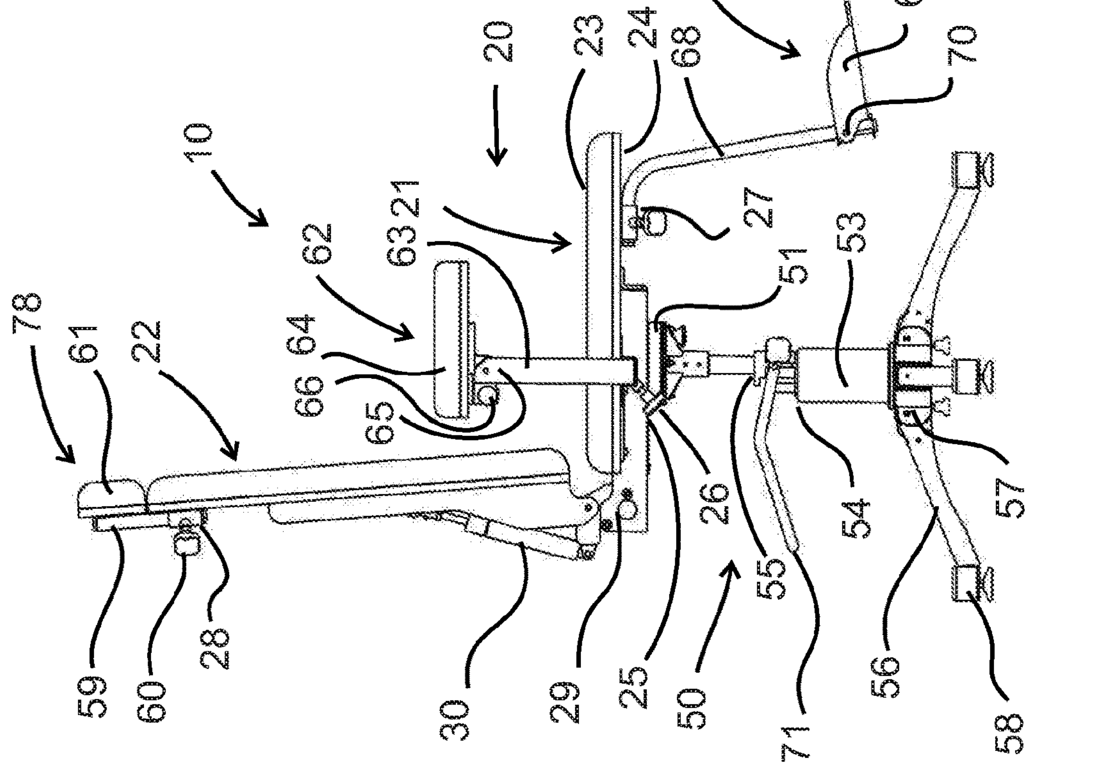
Figure 3B:
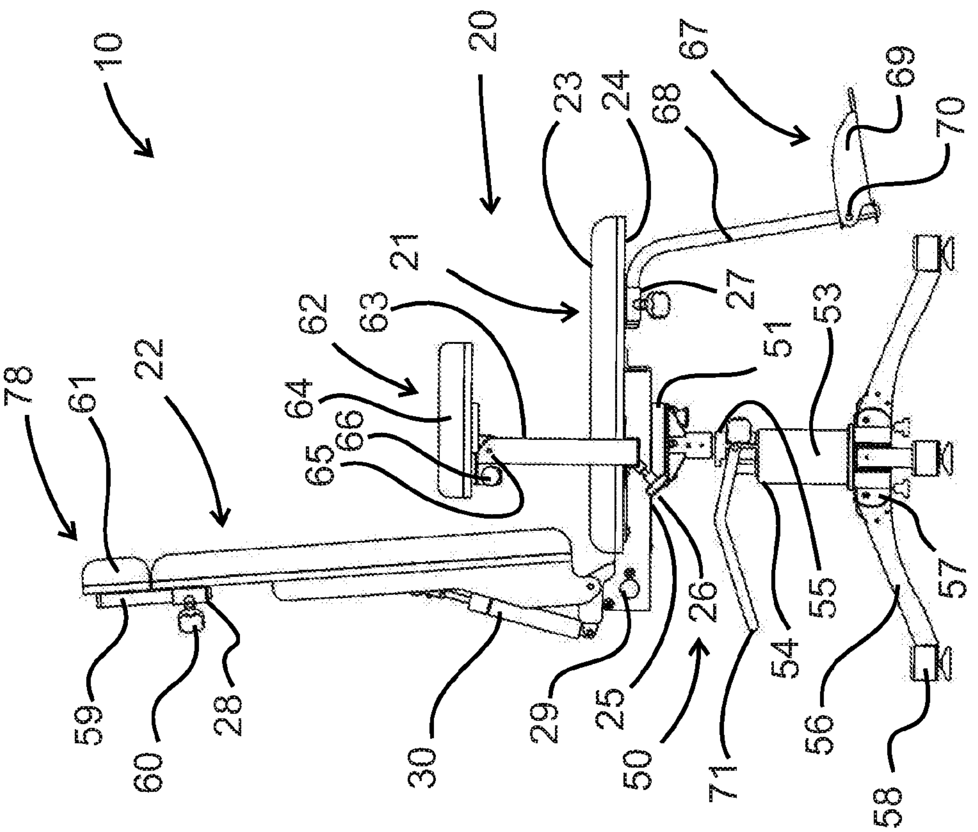
FIGS. 3A and 3B are side views of the assemblage of FIGS. 1A and 1B showing maximum and minimum height adjustment respectively.
Figure 3A:
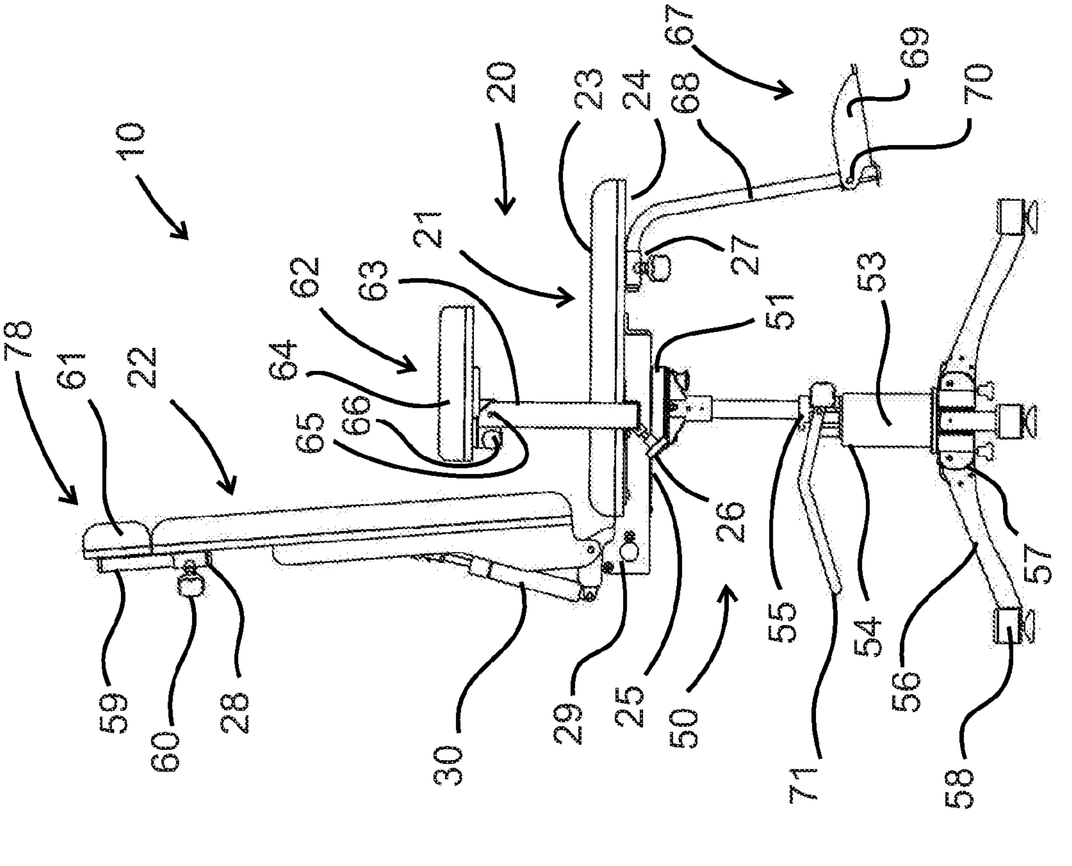
Figure 4:
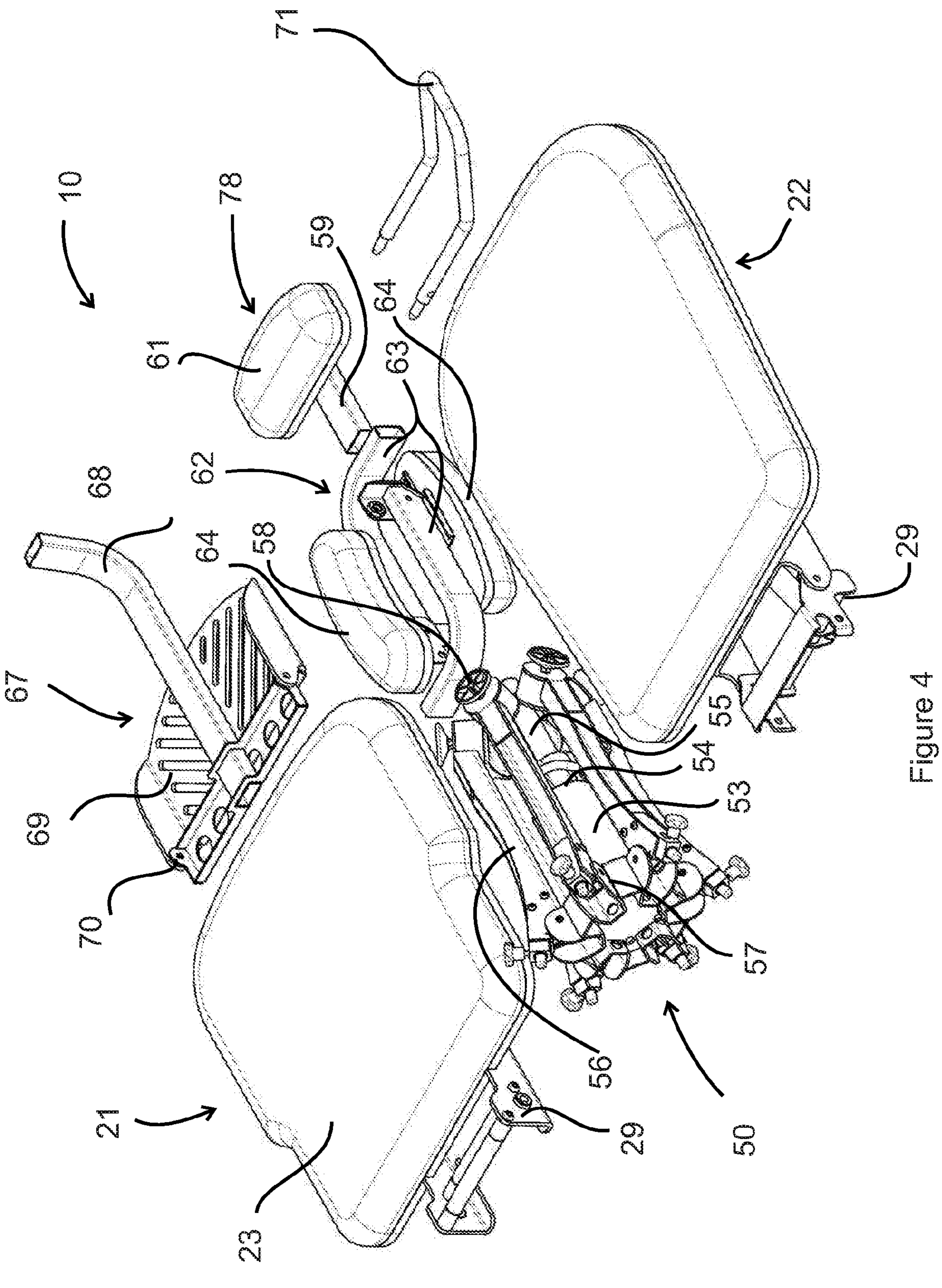
FIG. 4 is a perspective view of the assemblage of FIGS. 1A and 1B disassembled for storage and transport.

Thus, referring to FIGS. 1A, 1B, 2A, 2B, 3A, 3B and 4, an embodiment of an assemblage 10 of the present invention is shown assembled into a treatment chair in FIGS. 1A, 1B, 2A, 2B, 3A, and 3B, and disassembled in FIG. 4. It is to be noted that not all of the features of the assemblage are shown in each of the Figures.

The assemblage 10 comprises a seat and backrest assembly 20 and a stand assembly 50.

Figure 6B:
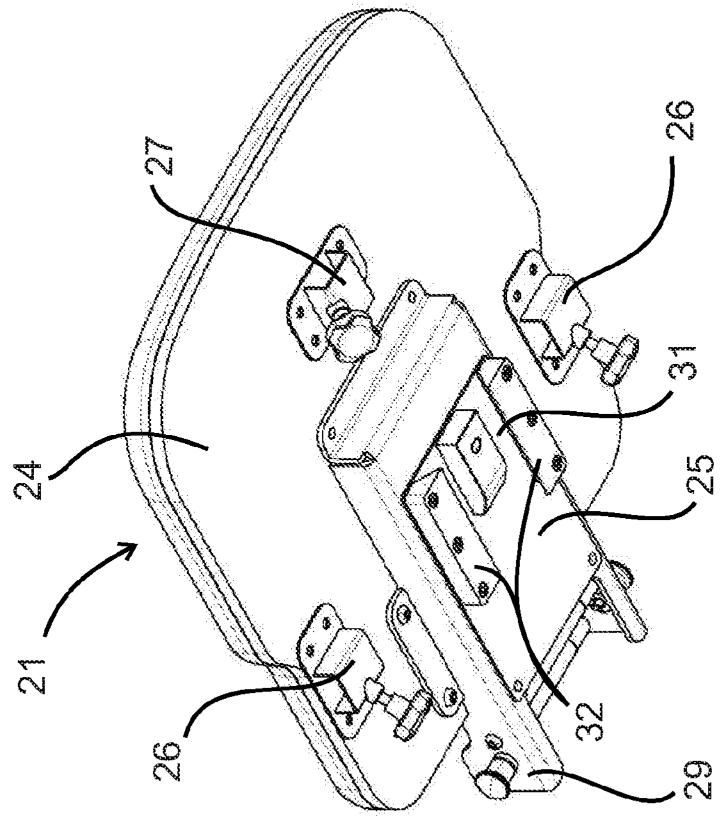
FIGS. 6A and 6B are perspective views of the front and rear respectively of the seat of the assemblage shown in FIGS. 1A and 1B.
Figure 6A:
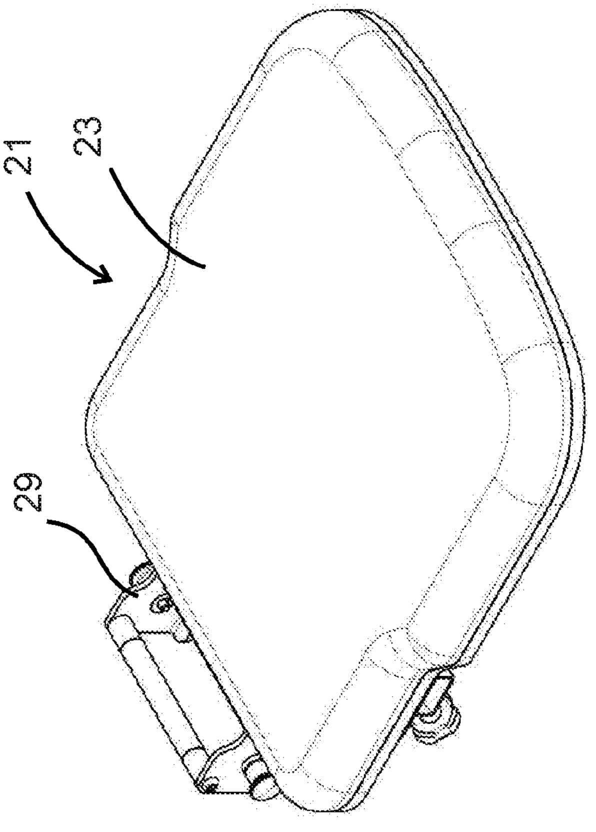
Figure 7B:
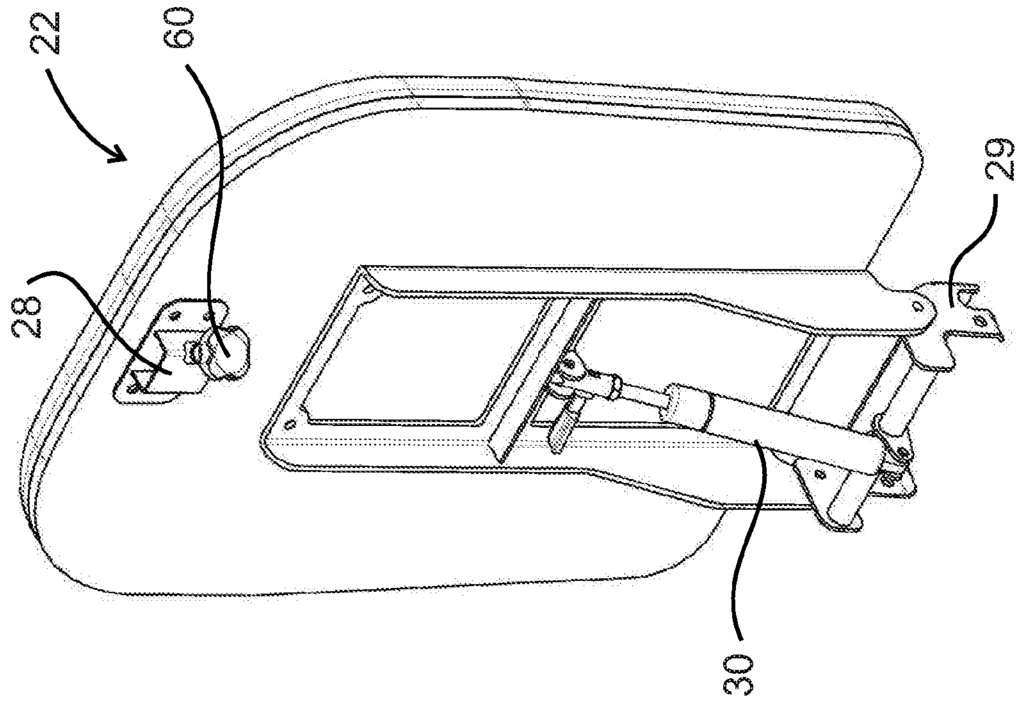
FIGS. 7A and 7B are perspective views of the upper side and underside respectively of the backrest of the assemblage shown in FIGS. 1A and 1B.
Figure 7A:
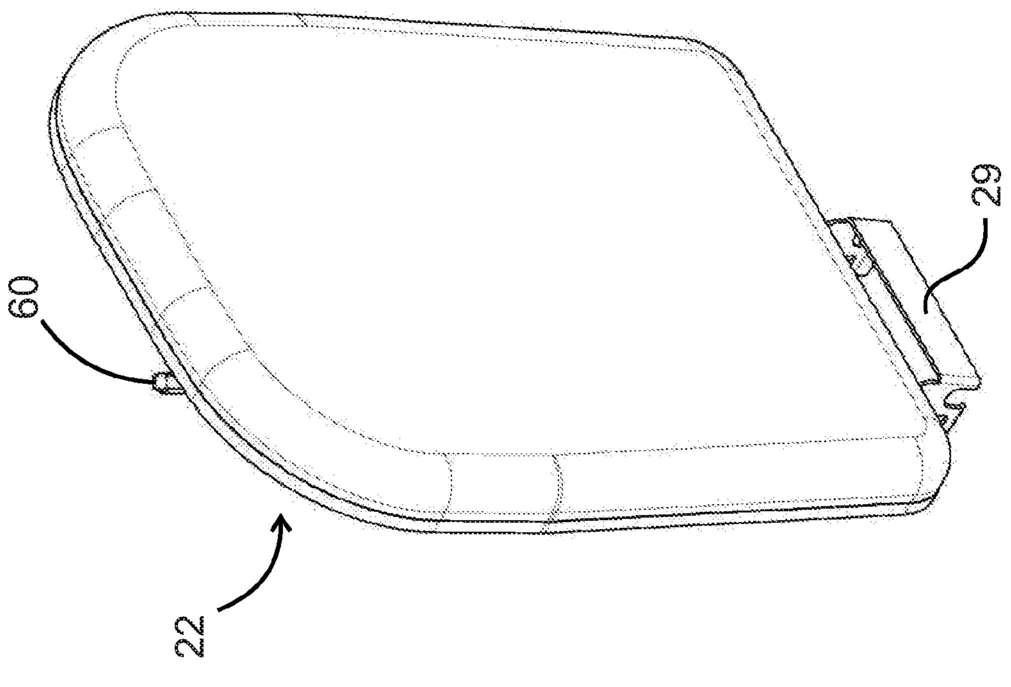

The seat and backrest assembly 20 comprises a seat 21 and a backrest 22. The seat 21 is shown separately in more detail in FIGS. 6A and 6B, the backrest 22 in FIGS. 7A and 7B, and the stand assembly 50 in FIGS. 5A and 5B respectively). The seat 21 comprises an upper side 23 on which the subject sits in use, and an underside 24 comprising a stand mounting means 25 for mounting the stand assembly 50. The underside 24 of the seat 21 also comprises armrest mounting means 26 and footrest mounting means 27.

The backrest 22 engages with the seat 21 so as to be independently reclinable with respect to the seat 21 and detachable from the seat 21, as shown in FIGS. 2A and 2B. The backrest 22 also comprises a headrest mounting means 28 on the rear. The backrest 22 is hinged to the seat by hinge 29 and is reclinable through a gas spring 30.

The stand assembly 50 comprises seat engagement means in the form of an engagement member 51 which slides and releasably locks in a corresponding receiver 31 on the underside 24 of the seat 21. The engagement member 51 and receiver 31 are configured to intimately cooperate to substantially prevent relative movement therebetween when engaged. Thus, the receiver 31 comprises projections 32 having a substantially triangular cross-section which are received by the corresponding grooves (not shown) in the engagement member 51. The engagement member 51 releasably locks into the receiver 31 by a locking pin (not shown).

The stand assembly 50 comprises hydraulic height adjustment means 53. The hydraulic height adjustment means 53 comprises an outer member 54, and inner member 55 telescopically slidable and rotatable within the outer member 54. The inner member 55 is moved hydraulically telescopically in and out of the outer member 54 by pumping hydraulic fluid into and out of the outer member 54, using lever 71. The seat engagement member 51 is located at the free end of the inner member 55. The hydraulic height adjustment means 53 may comprise releasable locking means (not shown) for releasably locking the amount of telescopic extension of the inner member 55 from the outer member 54 by preventing ingress and egress of hydraulic fluid, whilst leaving the inner member 55 free to rotate within the outer member 54. FIGS. 3A and 3B show the maximum and minimum height adjustments respectively of the assemblage 10.

Figure 5B:
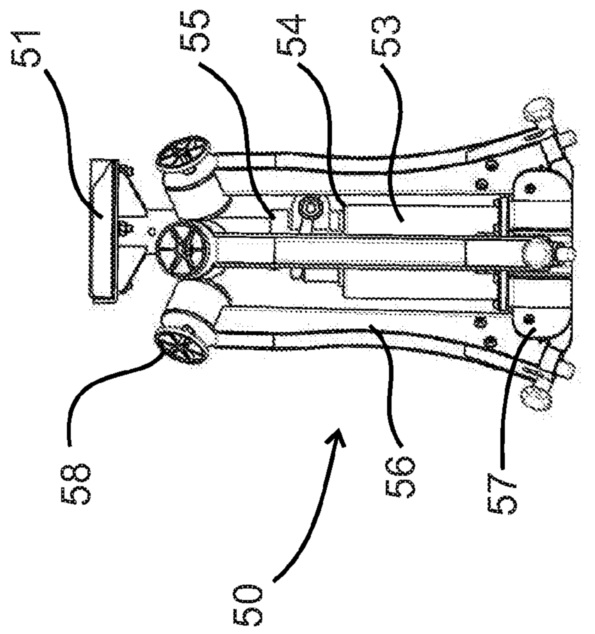
FIGS. 5A and 5B are side views of the stand assembly of the assemblage of FIGS. 1A and 1B in open and folded positions respectively.
Figure 5A:
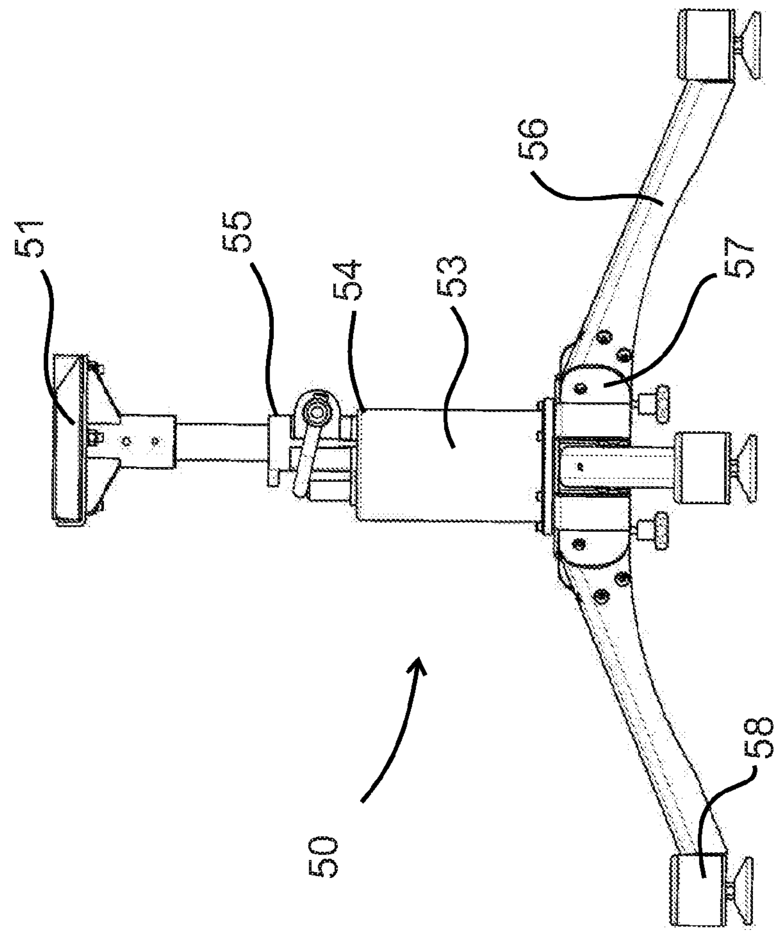

The stand assembly 50 also comprises legs 56 for supporting the chair in use (for ease of reference, only one leg 56 is identified as appropriate in the Figures). The legs 56 are foldable from an extended position (as shown in Figures FIGS. 1A, 1B, 2A, 2B, 3A, and 3B) in which they extend laterally from the stand assembly 50 to support the chair in use, and a folded position (as shown in FIGS. 4 and 5B) in which they lie against the outer member 54 of the hydraulic height adjustment means 53. The legs 56 are pivotally attached to the lower (closed) end of the outer member 54 at their proximal ends 57, and are lockable in the extended and folded positions by locking pins (not shown). The legs 56 comprise feet 58 at their distal ends to support the chair in use, which screw into the distal ends of the legs 56. This allows for depth adjustment of the feet 58 relative to the legs 56 for levelling the height of the chair. The number of legs 56 is not critical but must be sufficient to provide the chair with sufficient stability in use. The embodiment shown in the Figures comprises six legs 56, but other embodiments may have more or fewer legs 56.

Figure 10B:
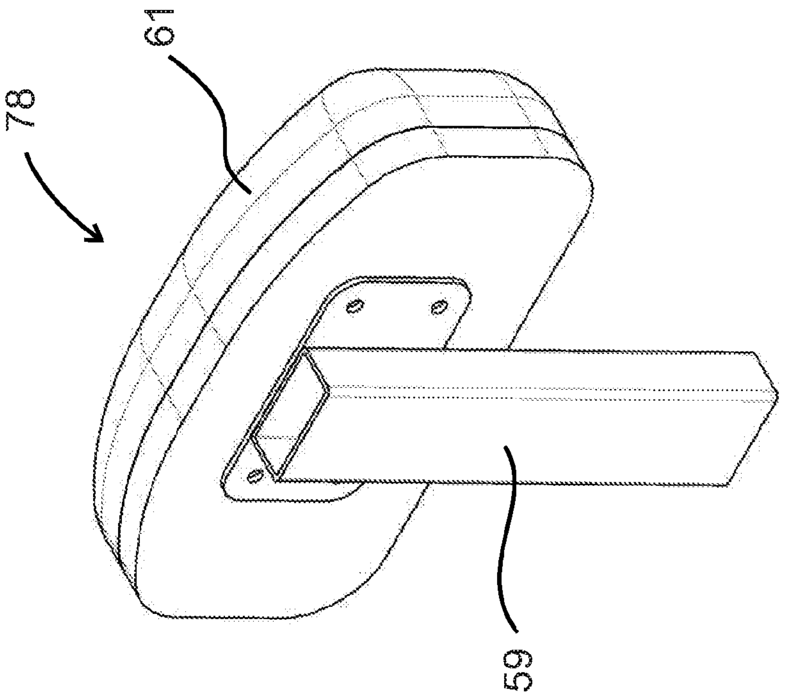
FIGS. 10A and 10B are perspective views of the front and rear respectively of the headrest of the assemblage shown in FIGS. 1A and 1B in open and folded positions respectively.
Figure 10A:
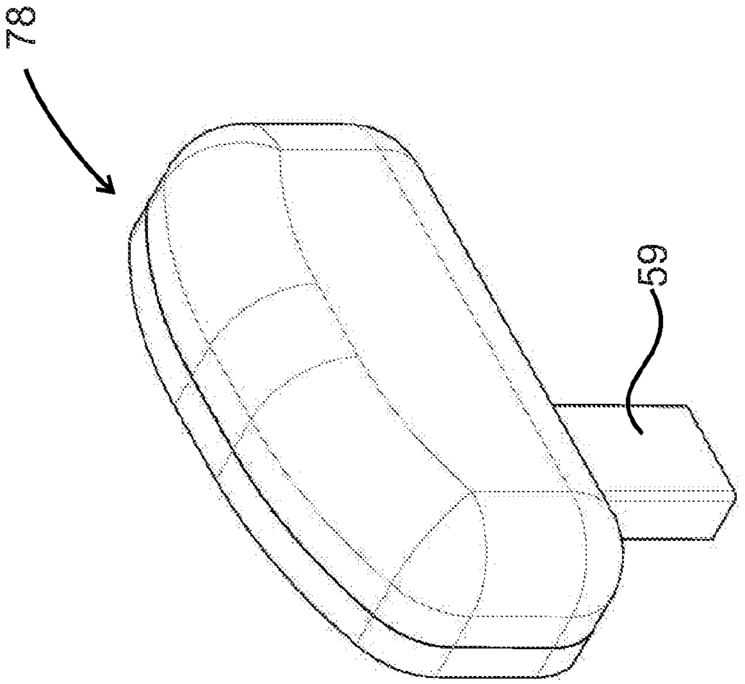

The assemblage 10 comprises a headrest 78 (shown separately in FIGS. 10A and 10B) which in use is releasably mounted to the headrest mounting means 28 on the backrest 22. The headrest 78 comprises an elongate member 59 the proximal end of which can slide into the headrest mounting means 28 and be held in position by a thumbscrew 60. At the distal end of the elongate member 59 there is a headrest pad 61 for supporting the head of a subject occupying the chair in use. The distance between the headrest pad 61 and the backrest 22 can be adjusted by sliding the elongate member 59 into and out of the headrest mounting means 28 and locking in position with the thumbscrew 60.

Figure 8B:
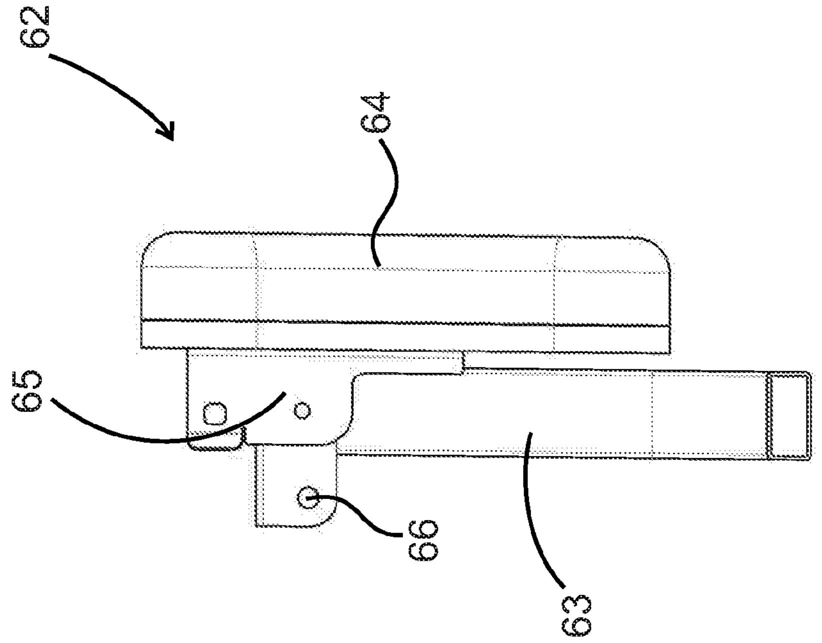
FIGS. 8A and 8B are side views of an armrest of the assemblage shown in FIGS. 1A and 1B in open and folded positions respectively.
Figure 8A:
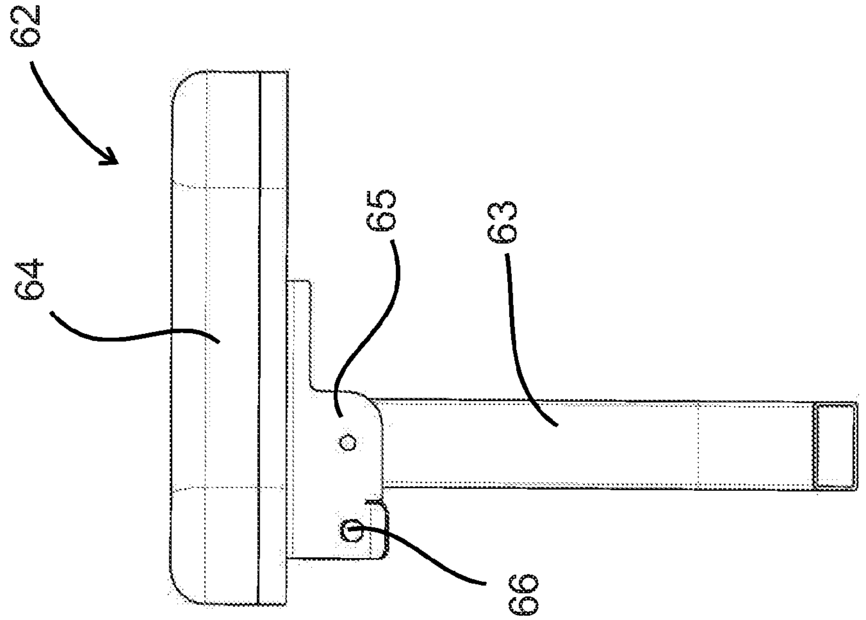

The assemblage 10 further comprises armrests 62 (shown separately in FIGS. 8A and 8B), in use releasably mounted to the armrest mounting means 26 on the underside 24 of the seat 21. Each of the armrests 62 comprises an elongate member 63 which curves through substantially a right-angle, a proximal end of which slides into the armrest mounting means 26, and is held in position by for example a locking pin or thumbscrew (not shown). At a distal end of each elongate member 63 there is attached an armrest pad 64, which is foldable between an extended position (shown in shown in FIGS. 1A, 1B, 2A, 2B, 3A, and 3B), for supporting the arms of a subject occupying the chair in use, and a folded position (shown in FIGS. 4 and 8B), in which the armrest pad 64 lies substantially parallel with the elongate member 63. The armrest pad 64 is attached to the distal end of the elongate member 63 by a hinge 65, and is lockable in position a locking pin 66. The assemblage 10 embodiment shown in FIGS. 1A, 1B, 2A, 2B, 3A, 3B and 4 comprises two arm rests, positioned in use laterally on either side of the seat 21.

Figure 9B:
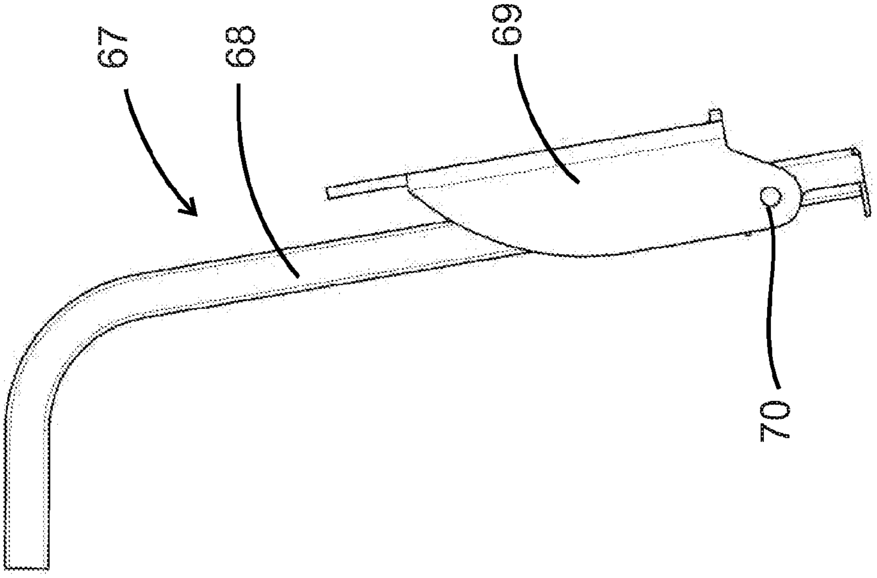
FIGS. 9A and 9B are side views of a footrest of the assemblage shown in FIGS. 1A and 1B in open and folded positions respectively.
Figure 9A:
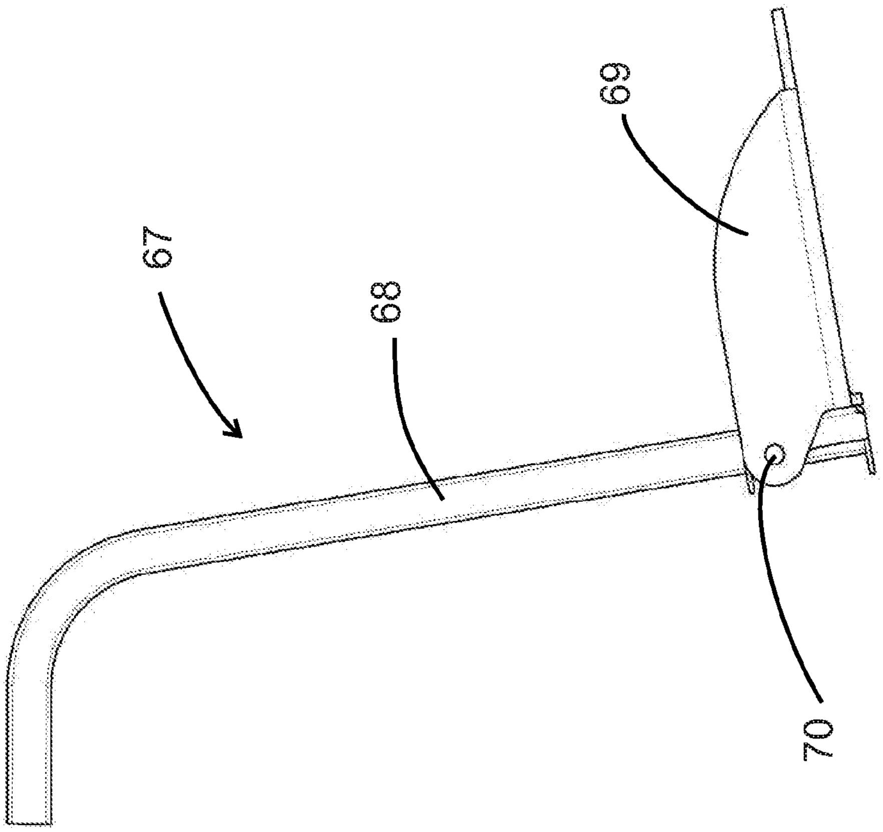

The assemblage 10 further comprises a footrest 67 (shown separately in FIGS. 9A and 9B), in use releasably mounted to the footrest mounting means 27 on the underside 24 of the seat 21. The footrest 67 comprises an elongate member 68 which curves through substantially a right-angle, a proximal end of which slides into the footrest mounting means 27, and is held in position by for example a locking pin or thumbscrew (not shown). At a distal end of the elongate member 68 there is attached a foot support 69, which is foldable between an extended position (shown in FIGS. 1A, 1B, 2A, 2B, 3A, and 3B), for supporting the feet of a subject occupying the chair in use, and a folded position (shown in FIGS. 4 and 9B), in which the foot support 69 lies up against the elongate member 68. The foot support 69 is attached to the distal end of the elongate member 68 by a hinge 70, and preferably comprises a stop to limit the relative maximum angle between the foot support 69 and the elongate member 68 in the extended position, for example to prevent the foot support 69 from unfolding beyond substantially a right-angle.

The embodiment of the assemblage 10 shown assembled in FIGS. 1A, 1B, 2A, 2B, 3A, and 3B can be disassembled as follows, although the various disassembly steps need not be performed in the particular order described.

Headrest 78 can be removed by releasing the elongate member 59 from the headrest mounting means 28 using thumbscrew 60. Armrests 62 can be removed by releasing the elongate members 63 from the armrest mounting means 26. The armrest pads 64 can then be folded into the folded position by releasing the locking pin 66. The footrest 67 can be removed by releasing the elongate member 68 from the footrest mounting means 27. The foot support 69 can then be folded into the folded position through hinge 70. The backrest 22 can be detached from the seat and backrest assembly 20. The stand assembly 50 can be disengaged from the seat 21 by releasing the engagement member 51 from release member 31 by releasing the locking pin (not shown), firstly lowering the seat 21 to the minimum height if necessary using the hydraulic height adjustment means 53. The feet 58 can be detached (by unscrewing) if necessary, and the legs 56 can then be folded into the folded position. The disassembled assemblage can then be packed into a carry case or bag (not shown), stowed in the boot of a car, and transported to a different location for reassembly.

It will be appreciated that the specific embodiments described herein are for illustrative purposes only, and that further modifications and variations of the embodiments are possible without departing from the scope of the present invention as defined by the appended claims.

The invention claimed is:

1. An assemblage for assembling into a treatment chair for seating a subject undergoing a personal treatment and subsequently disassembling for reassembly, the assemblage comprising a seat and backrest assembly, and a stand assembly for rotatably supporting the seat and backrest assembly;

wherein the seat and backrest assembly comprises a seat and a backrest;

the seat comprising an upper side on which the subject sits in use, and an underside comprising a stand assembly mounting means for releasably mounting the stand assembly;

the backrest engaging with the seat so as to be independently reclinable with respect to the seat, and being detachable from the seat and/or foldable onto the upper side of the seat so as to lie substantially flat therewith;

wherein the stand assembly comprises seat engagement means for releasably engaging with the underside of the seat; hydraulic height adjustment means for hydraulically raising and lowering the height of the seat and backrest assembly in use, and legs which are foldable between an extended position in which the legs extend laterally from the stand assembly to support the treatment chair in use, and a folded position in which they lie against or adjacent the hydraulic height adjustment means, further comprising carrying and/or storage means, wherein the carrying and/or storage means comprises one or more foam-containing cases, wherein the foam comprises recesses into which different component parts of the assemblage may be placed.

2. An assemblage according to claim 1 wherein the backrest is reclinable through a reclinement adjustment means, wherein the reclinement adjustment means allows the backrest to be releasably locked at different angles of inclination relative to the seat.

3. An assemblage according to claim 1 wherein the seat engagement means comprises an engagement member which slides and releasably locks into a corresponding receiver on the underside of the seat, wherein the engagement member and receiver are configured to intimately cooperate to substantially prevent relative movement therebetween when engaged, and wherein the engagement member comprises one or more guide slots or recesses which are configured to receive one or more correspondingly shaped projections of the receiver, or vice versa.

4. An assemblage according to claim 1 wherein the legs are pivotally attached to a lower end in use of the hydraulic height adjustment means at proximal ends, and are be lockable in the extended and folded positions.

5. An assemblage according to claim 1 wherein the legs comprise feet at distal ends to support the treatment chair in use, the feet being either fixed in position relative to the legs, or foldable between extended and folded positions relative to the legs.

6. An assemblage according to claim 1 which further comprises armrest mounting means for releasably mounting arm rests, and/or a footrest mounting means for releasably mounting a footrest, and/or a headrest mounting means for releasably mounting a headrest.

7. An assemblage according to claim 6, wherein the armrest mounting means and/or the footrest mounting means are located on the underside of the seat, and/or the headrest mounting means is located on a rear of the backrest.

8. An assemblage according to claim 6 which further comprises armrests, for releasably mounting to the armrest mounting means.

9. An assemblage according to claim 8 wherein each of the armrests comprises an elongate member, a proximal end of which is slideable into the armrest mounting means, and at a distal end of which there is attached an armrest pad, wherein each armrest pad is foldable between an extended position, for supporting the arms of a subject occupying the chair in use, and a folded position, in which the armrest pad lies substantially parallel with or adjacent the elongate member.

10. An assemblage according to claim 6 which further comprises a footrest for releasably mounting to the footrest mounting means.

11. An assemblage according to claim 10 wherein the footrest comprises an elongate member, a proximal end of which is slideable into the footrest mounting means, and at a distal end of which there is attached a foot support, wherein the foot support is either fixed in position relative to the elongate member, or is foldable between an extended position, for supporting feet of a subject occupying the chair in use, and a folded position, in which the foot support lies substantially parallel with or adjacent the elongate member.

12. An assemblage according to claim 11 which comprises a stop to limit a relative maximum angle between the foot support and the elongate member in the extended position.

13. An assemblage according to claim 6 which further comprises a headrest for releasably mounting to the headrest mounting means.

14. An assemblage according to claim 13 wherein the headrest comprises an elongate member having a proximal end which is slideable into the headrest mounting means, and at a distal end has attached a headrest pad for supporting a head of a subject occupying the chair in use, and wherein a distance between the headrest pad and the backrest is adjustable in use by sliding the elongate member into and out of the mounting means.

15. An assemblage according to claim 1 which weighs 25 kg or less.

16. An assemblage according to claim 1 which can be assembled and disassembled by hand without the use of tools.

17. An assemblage according to claim 1 wherein, when assembled as a treatment chair, the seat and backrest assembly is rotatable on and height adjustable with respect to the stand assembly and the backrest is reclinable relative to the seat with an adult human subject occupying the treatment chair, wherein the subject weighs up to 120 kg.

18. A method of assembling an assemblage according to claim 1 into a treatment chair which comprises the following steps, performed in any order:

the legs are unfolded from the folded position to the extended position and optionally feet are attached to the legs or unfolded from the legs;

the stand assembly seat engagement means is engaged with the stand assembly mounting means;

the backrest is attached to the seat, or unfolded from a position substantially flat on the upper side of the seat to an upright position;

optionally, armrests, headrest and/or footrest are attached to the armrest, headrest and footrest mounting means respectively;

optionally, armrests, headrest and/or footrest are unfolded.

19. A method of disassembling an assemblage according to claim 1 assembled into a treatment chair which comprises the following steps, performed in any order:

optionally folding and removing armrests, headrest and/or footrest from the armrest, headrest and footrest mounting means respectively;

optionally lowering the seat and backrest assembly to the minimum height using the hydraulic height adjustment means;

detaching the backrest from the seat, or folding the backrest on to the upper side of the seat so as to lie substantially flat therewith;

disengaging the stand assembly from the stand assembly mounting means;

optionally folding the feet into the folded position, or detaching the feet from the legs, and folding the legs into the folded position.

20. An assemblage for assembling into a treatment chair for seating a subject undergoing a personal treatment and subsequently disassembling for reassembly, the assemblage comprising a seat and backrest assembly, and a stand assembly for rotatably supporting the seat and backrest assembly; wherein the seat and backrest assembly comprises a seat and a backrest; the seat comprising an upper side on which the subject sits in use, and an underside comprising a stand assembly mounting means for releasably mounting the stand assembly; the backrest engaging with the seat so as to be independently reclinable with respect to the seat, and being detachable from the seat and/or foldable onto the upper side of the seat so as to lie substantially flat therewith; wherein the stand assembly comprises seat engagement means for releasably engaging with the underside of the seat; hydraulic height adjustment means for hydraulically raising and lowering the height of the seat and backrest assembly in use, and legs which are foldable between an extended position in which the legs extend laterally from the stand assembly to support the treatment chair in use, and a folded position in which they lie against or adjacent the hydraulic height adjustment means; armrest mounting means for releasably mounting arm rests, and/or a footrest mounting means for releasably mounting a footrest, and/or a headrest mounting means for releasably mounting a headrest; a footrest for releasably mounting to the footrest mounting means; and a stop to limit a relative maximum angle between the foot support and an elongate member in the extended position.

* * * * *